United States Patent [19]
Grove

[11] 3,827,285
[45] Aug. 6, 1974

[54] FLOW CONTROL APPARATUS AND METHOD WITH LEAK DETECTION
[75] Inventor: Marvin H. Grove, Houston, Tex.
[73] Assignee: M & J Valve Company, Houston, Tex.
[22] Filed: May 21, 1973
[21] Appl. No.: 362,231

Related U.S. Application Data
[63] Continuation-in-part of Ser. Nos. 242,125, April 7, 1972, and Ser. No. 274,441, July 24, 1972, abandoned.

[52] U.S. Cl..................... 73/46, 137/312, 251/333, 277/2
[51] Int. Cl............................................ G01m 3/28
[58] Field of Search............. 73/3, 40, 46; 340/242; 251/175, 190, 191, 318, 319, 333, 334, 324; 137/312; 277/2

[56] References Cited
UNITED STATES PATENTS
| | | | |
|---|---|---|---|
| 1,022,865 | 4/1912 | Nicolai | 277/2 |
| 2,631,001 | 3/1953 | Griswold | 137/312 |
| 3,605,810 | 9/1971 | Moroney | 251/175 |
| 3,682,198 | 8/1972 | Davis | 73/3 |

FOREIGN PATENTS OR APPLICATIONS
982,975  2/1965  Great Britain ........................ 277/2

*Primary Examiner*—S. Clement Swisher
*Attorney, Agent, or Firm*—Flehr, Hohbach, Test, Albritton & Herbert

[57] ABSTRACT

Apparatus for forming a liquid seal between two fluid spaces. A plunger means is movable between retracted and projected positions with respect to a sleeve that connects the spaces. Resilient sealing members carried by the plunger are so constructed that when contracted and stressed by movement into the sleeve, a pressure drop occurs in the space between the members. The resulting pressure differential is used to detect leakage. Also a method for leak detection making use of such apparatus.

8 Claims, 4 Drawing Figures

3,827,285

FLOW CONTROL APPARATUS AND METHOD WITH LEAK DETECTION

CROSS-REFERENCE TO RELATED APPLICATIONS

This application is a continuation-in-part of my co-pending applications Ser. No. 242,125 filed Apr. 7, 1972, and Ser. No. 274,441 filed July 24, 1972 now abandoned.

BACKGROUND OF THE INVENTION

This invention relates generally to apparatus and methods wherein a passage between the two fluid spaces is closed or opened by use of a guided closure or barrier member that is movable between closed and open positions. Preferably the invention incorporates means for detecting liquid leakage past the member.

In many instances a passage between two fluid spaces is closed or opened by use of a member that is movable between closed and open positions. Examples are fluid flow control valves or diverters and so-called meter provers. Assuming that the member is in the form of a plunger-like closure or barrier that is moved axially between its operating positions, various types of sealing means have been employed to prevent leakage when the member is in closed position, including the use of seals made of resilient material like synthetic rubber. An O-ring is an example of such a seal. Where the service requirements are critical, the seal should be completely tight for closed position. There are also instances where it is important to detect any leakage past the sealing means when the member is in its closed position. In this connection reference can be made to so-called meter provers used with liquid pipe lines which have an interchange between the inlet and outlet ends of a metering pipe, together with means for preventing flow through the interchange during a proving run. Any leakage through the interchange must be promptly detected and corrected to avoid inaccuracy.

One type of leak detector that has been used is disclosed and claimed in U.S. Pat. No. 3,423,988. In that instance the interchange of a meter prover employs two serially connected gate valves. To detect leakage through the interchange the connecting space between the two valves is vented to the atmosphere, and thereafter any build-up of pressure due to leakage past one of the valves is detected. As shown in U.S. Pat. No. 3,398,761, the body space of a gate valve is vented, and thereafter any rise in pressure due to leakage actuates a pressure switch which controls an indicating circuit. One characteristic of such detecting devices is that if the pressures involved are quite low, the pressure differential obtained by venting as described above may be insufficient for a reliable indication. On the other hand, if the pressures involved are quite high, the leak test may not be reliable because venting to atmosphere creates abnormal pressure differential on the sealing means. Also such venting provides a differential pressure that varies according to the line pressure. In addition, venting necessarily involves discharge of some fluid, which in many instances is objectionable.

In addition to the use of resilient O-rings as the sealing means, various pistons and plungers have been sealed by the use of sealing cups made of resilient material. It is customary to make the cups out of a suitable resilient material such as leather, synthetic rubber or elastomer. The cup flanges or rim is held in a predetermined position by engagement with the inner surfaces of an associated cylinder, the normal positioning being such that substantially the entire outer peripheral surface of the rim is in contact with the inner surface of the cylinder. Also the edge of the rim is usually feathered to promote effective sealing. In some instances two such cups are used with the rims or open sides of the cups being faced in opposite directions. With such an arrangement, only the cup which has its open face toward the pressure side is urged by fluid pressure against the surfaces of the surrounding cylinder.

SUMMARY OF THE INVENTION

The present invention, in contrast to the above described prior apparatus and methods, is characterized by a pressure drop produced by the stressing of cup-like sealing members when these members are projected with radial contraction into sealing relation with the cooperating surface of a cylindrical sleeve or like member. In its preferred form the apparatus employs a plunger or barrier having two oppositely faced cup-shaped sealing members of resilient material. The sealing members and the sleeve are so constructed and proportioned that when the barrier is moved into the sleeve, stressing of the resilient members by radial contraction causes a drop in pressure in the space between these members.

In general it is an object of the invention to provide an apparatus and method making use of a plunger or barrier which is moved between open and closed positions with respect to a fluid passage formed by a cylindrical sleeve connecting two fluid spaces, and which makes use of resilient sealing cups in a new manner to obtain effective sealing.

Another object is to provide an apparatus and method incorporating leak detection means which will avoid the necessity of venting liquid from a closed space, as in the above described prior apparatus and method.

Another object is to provide an apparatus and method of the above character which will afford reliable leak detection over a wide variety of line pressures.

Additional objects and features of the invention will appear from the following description in which the preferred embodiment has been shown in conjunction with the accompanying drawing.

DESCRIPTION OF THE PREFERRED EMBODIMENT

Figure 1:
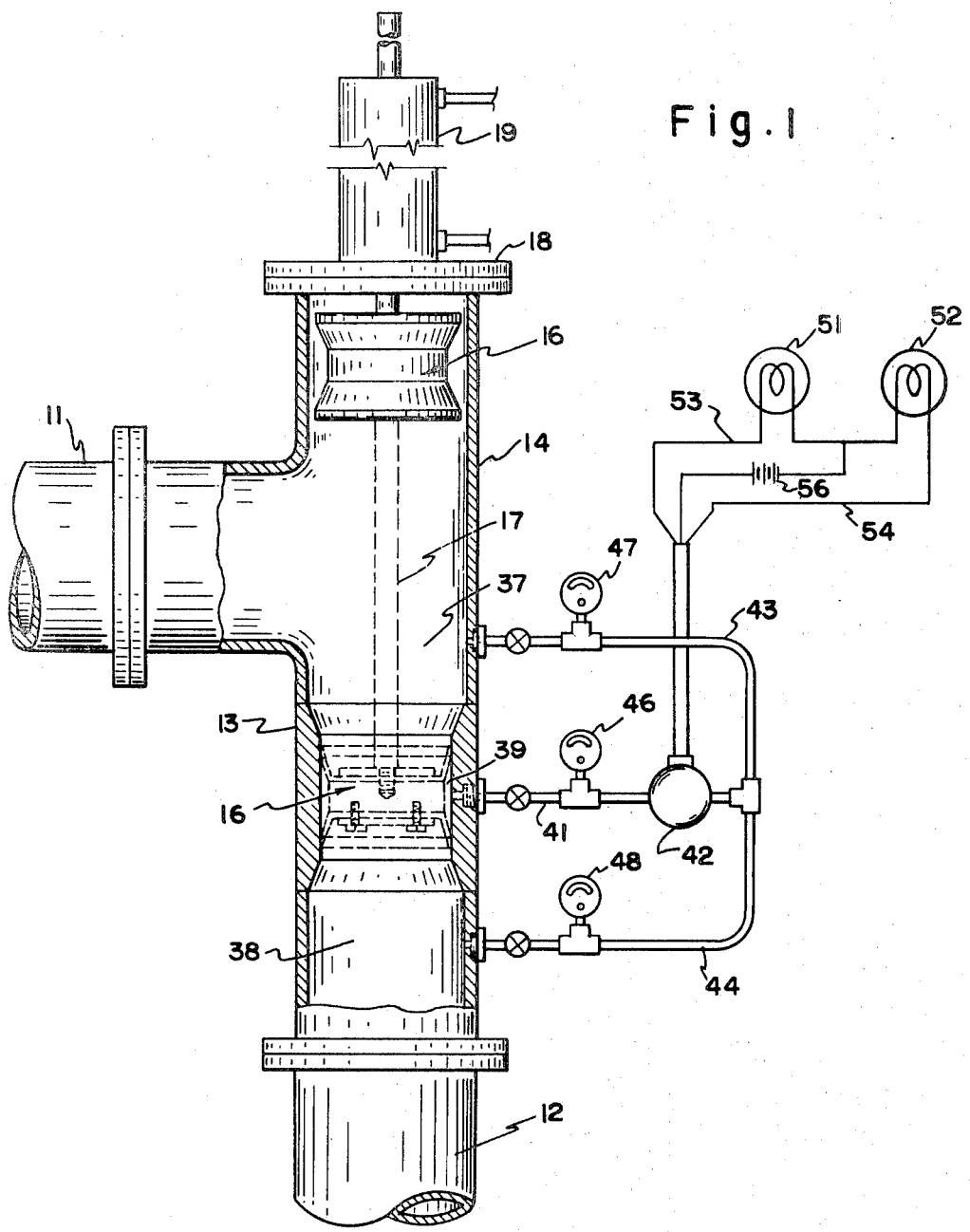
FIG. 1 is a side elevational view partly in section illustrating apparatus incorporating the present invention.

The apparatus illustrated in FIG. 1 consists of liquid pipes 11 and 12 which are interconnected by means including the sleeve 13. That part adjacent one end of the sleeve 13 is in the form of a tee 14 which accommodates a plunger or barrier 16. The plunger is carried by an axially guided operating rod 17 which in turn extends through the closure plate 18 mounted on one end of the tee. The exterior end of the operating rod 17 is connected to a suitable power operator 19, such as a doubleacting hydraulic cylinder-piston assembly which when energized serves to move the plunger between operating positions, one being retracted as shown in FIG. 1, and the other being projected within the sleeve 13 as shown in dotted lines.

Figure 2:
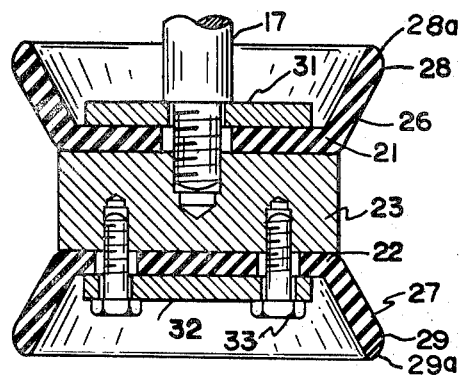
FIG. 2 is an enlarged detail in section showing the plunger incorporated in FIG. 1.

A suitable construction for the plunger is shown in FIG. 2. It consists of oppositely faced cup-shaped sealing members 21 and 22 made of suitable resilient material, such as a synthetic rubber or elastomer. The bases of the sealing members are clamped upon the faces of an annular spacer 23, which has a diameter smaller than the diameter of the inner cylindrical surface 24 of the sleeve 13. The rims 26 and 27 of the sealing members, when relaxed, are dimensioned whereby they are contracted and stressed when positioned within the sleeve 13 in the manner shown in FIG. 4. Also when contracted within the sleeve 13, the peripheral surfaces 28 and 29 at the edge margins of the rims 26 and 27 are pressed into sealing engagement with the surface 24 of the sleeve 13 on axially spaced annular sealing areas.

The edge margins of the rims 26 and 27 also have bevelled portions 28a and 29a, and the sleeve 13 has converging entrant portions 13a and 13b. As viewed in section the angle of the entrant portions is substantially less than 45°. This insures proper contraction of sealing engagement with the advancing cup when the plunger is moved into the sleeve.

To complete the plunger assembly, suitable means are provided for clamping the bases of the sealing members against the spacer 23, as for example, the end clamping disks 31 and 32. The rod 17 is shown having threaded engagement with the spacer 23, with the clamping disk 31 being clamped upon the base portion of sealing member 21. The clamping disk 32 is shown being clamped against the base portion of sealing member 22 by screws 33. It will be appreciated that the details of the plunger assembly and the manner of mounting and clamping the sealing members may vary without affecting the desired mode of operation.

By way of example, the internal diameter of the sleeve 13 may be 8 inches. The diameter of the surfaces 28 and 29 of the sealing members 21 and 22, when these members are relaxed, may be of the order of 8 ½ inches.

Figure 3:
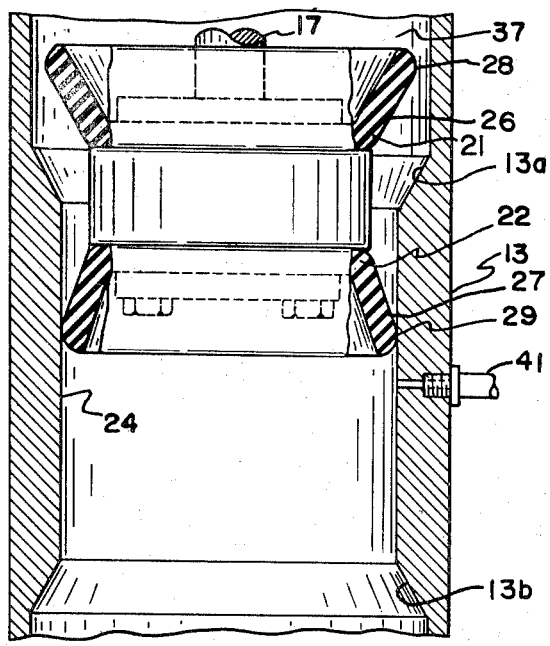
FIG. 3 is a detail in section illustrating the plunger of FIG. 2 projected part way into the accompanying sleeve.

When the plunger is moved from its retracted position in space 37 to its projected position, the beveled edge 29a of the sealing member 22 first engages the converging entrant surface 13a of the sleeve 13, and during further movement the rim 27 is contracted and stressed as it proceeds to a position within the sleeve, as shown in FIG. 3. In this position it will be evident that the fluid space 37 at one end of the sleeve is in free communication with space 37. Further movement of the plunger to the fully projected position shown in FIG. 4 causes the rim 26 of the sealing member 21 to be contracted and stressed as it enters the entrant portion 13a of the sleeve and reaches the position shown in FIG. 4. The annular surface areas 28 and 29 of the sealing members now have effective sealing engagement with the inner surface 24 of the sleeve 13, and therefore the plunger provides an effective closure or seal between the spaces 37 and 38 communicating with the ends of the sleeve. It has been discovered that when the plunger is moved into its fully projected position and the sealing members are successively contracted and stressed as they pass into the cylindrical surface 24, a substantial drop in pressure occurs in the space 39 between the sealing members. This drop in pressure below the pressure in space 37 is attributed to the change in the physical form of the sealing member 21 as its rim 26 is contracted and stressed by flexing as it is moved into the cylindrical surface 24. For a particular plunger construction it has been found that the pressure drop experienced provides a pressure differential between pressure existing in space 37 at the time the plunger is projected and the closed space 39. In meter provers where the plunger is used to seal the interchange, this pressure differential in typical instances may be of the order of 10 to 15 p.s.i., and for a given plunger construction and given operating conditions, the differential remains constant unless a change of static pressure in space 37 should occur after the plunger is projected.

It will be apparent that after movement of the plunger to its projected position, if any leakage occurs past either of the sealing members, then a rise in pressure in space 39 will occur, or in other words, the pressure differential will decrease. It has been found that such decrease in pressure differential serves as a reliable indication of leakage.

FIG. 1 shows means which is responsive to the pressure differential referred to above, and which serves to indicate any loss of differential pressure as a result of leakage past either of the sealing members. A pipe 41 is shown connecting the space 39 with a pressure differential operated switch 42. This switch is one of the type having two closed fluid pressure chambers separated by a movable fluid pressure operated member (e.g., a diaphragm. Movements of the pressure operated member in response to a difference in the fluid pressure applied to the chambers serves in turn to operate electrical contacts. Pipe 41 connects with one of the chambers of switch 42, and the other chamber of the switch is shown connected by pipe 43 with the space 37. An additional normally closed pipe 44 is shown connected between space 38 and switch 42. All of the pipes 41, 43 and 44 are shown provided with pressure gauges 46, 47 and 48, although this is not necessary. Pipe 44 may be omitted, and is included onto to illustrate an alternative method of operation as will be presently described.

The connections to the chambers of the switch 42 is in effect a closed liquid system, or in other words, the pipes serve to transmit static pressure to the switch 42 without any substantial liquid flow.

The contacts of switch 42 are shown connected to indicating means such as the electric lamps 51 and 52 (e.g., red and green). The lamps are shown connected in circuits 53 and 54 extending from the contacts of switch 42, and supplied from a common battery or other energy source 56. The arrangement is such that when the pressure differential applied to the switch 42 is greater than a specified value, one of the lamps (e.g., green) is illuminated, and when the pressure differential drops to a value below the minimum, then the one lamp is extinguished, and the other lamp (e.g., red) is illuminated.

The overall operation of the apparatus described above and the method involved are as follows. When the plunger 16 is fully retracted as shown in FIG. 1, there is free communication between the spaces 37 and 38. When it is desired to interrupt such communication the hydraulic operator 19 is energized to move the plunger to its projected position shown in FIGS. 1 and 3. During the final part of the movement of the plunger the rim 26 of the sealing member 21 is contracted and stressed, with the result that the pressure in space 39 is reduced below the pressure in space 37. The pressure differential is applied to switch 42 whereby contacts are closed to illuminate lamp 51. If this lamp remains illuminated for a short time, no liquid is leaking into space 39 and therefore there is no leakage between spaces 37 and 38. However, if leakage does occur past either sealing member the pressure differential is reduced and when it becomes less than a value determined by setting the switch 42, lamp 51 is extinguished and lamp 52 illuminated to indicate the leak.

The conditions referred to above (i.e., a leak or absence of a leak) can also be determined by noting the reading of gauges 46 and 47.

In some instances the plunger may enter the sleeve from the side of space 38. In such event, line 43 is closed and lines 41 and 42 opened to operate the switch. Also in some instances the static pressures in spaces 37 and 38 may be nearly the same. Under such conditions either one of pipes 43 or 44 may be open and the other closed.

Figure 4:
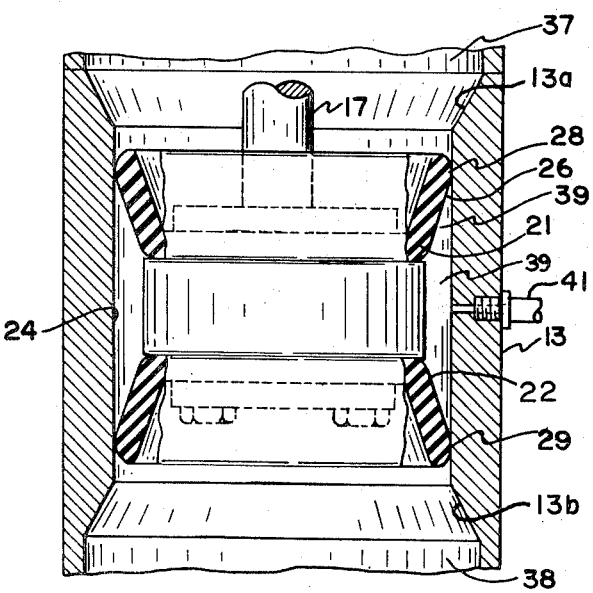
FIG. 4 is a detail in section like FIG. 3 but showing the plunger completely projected into the accompanying sleeve.

Aside from use of the pressure drop induced in space 39 when the plunger or barrier is positioned within the sleeve, this pressure drop aids in maintaining the desired seal. Referring to FIG. 4, it will be seen that such pressure drop serves to apply differential pressure to each of the rims 26 and 27 of the cups, thus exerting evenly distributed and outwardly directed forces against the inner surfaces of the rims. These forces are additive to other forces that urge the rims into sealing engagement with the inner surface 24 of the sleeve, including the inherent resistance to contraction offered by the rims. When the plunger is within the sleeve, the seal is maintained on the narrow areas 28 and 29 at the edge margins of the rims, with each rim as viewed in section (FIG. 4) being at an acute angle to the inner surface of the sleeve. Therefore, forces tending to expand a rim serve to urge its edge margin more tightly against the sleeve surface 24.

I claim:

1. In apparatus having pressure sealing and leak detection means, a sleeve having an inner cylindrical surface and a converging entrant portion at at least one end of the sleeve, means forming liquid enclosing spaces communicating with the ends of the sleeve, a plunger or barrier, means serving to carry the plunger for movements axially of the sleeve, and means for moving the plunger between a retracted position out of the sleeve and a projected position within the sleeve, said plunger comprising two oppositely faced cup-shaped sealing members made of resilient material, each of the sealing members having a rim conforming to a truncated cone when relaxed and having an annular surface at the edge margin of the rim adapted to engage and seal with respect to the inner surface of the sleeve, the diameters of said annular surfaces being substantially greater than the inner diameter of the sleeve when the members are relaxed, the rims of said members being contracted and stressed by flexing when projected into the sleeve, said rims as viewed in section when within the sleeve being at an acute angle to the inner cylindrical surface of the sleeve whereby forces tending to expand the rims serve to urge the edge margins against the sleeve.

2. Apparatus as in claim 1 in which the space between the sealing members is closed when the plunger is moved to said projected position, the contraction of the rim of one of the sealing members during such movement causing a drop in pressure in the last named space.

3. Apparatus as in claim 1 in which the liquid enclosing space occupied by the plunger in its retracted position is dimensioned to permit relaxation of the sealing members.

4. Apparatus as in claim 1 in which there is a convergent entrant portion at each end of the sleeve and the spaces communicating with the ends of the sleeve are dimensioned to permit radial expansion of the rims of the sealing members when the plunger is moved into either one of said spaces.

5. Apparatus as in claim 1 in which the edge margins of the rims are beveled to facilitate contraction when moved into the sleeve through an entrant portion.

6. In apparatus having pressure sealing and leak detection means, a sleeve having an inner cylindrical surface and a converging entrant portion at at least one end of the sleeve, means forming liquid enclosing spaces communicating with the ends of the sleeve, a plunger or barrier, means serving to carry the plunger for movements axially of the sleeve, and means for moving the plunger between a retracted position out of the sleeve and a projected position within the sleeve, said plunger comprising two oppositely faced cup-shaped sealing members made of resilient material, each of the sealing members having a rim conforming to a truncated cone when relaxed and having one annular surface near the edge of the rim adapted to engage and seal with respect to the inner surface of the sleeve, the diameters of said annular surfaces being substantially greater than the inner diameter of the sleeve when the members are relaxed, the rims of said members being contracted and stressed by flexing when projected into the sleeve whereby when the plunger is in its projected position the static pressure in the space between these sealing members is reduced to a level substantially less than the static pressure in the one space from which the plunger was projected, thereby providing a pressure differential between said one space and the space between the sealing members, and leak detection means exterior of the sleeve having a fluid connection with said space between the sealing members and also a fluid connection with one of said enclosing spaces, said leak detection means serving to indicate the presence of said pressure differential and also the reduction of such pressure differential below a predetermined amount.

7. Apparatus as in claim 6 in which said leak detection means includes a differential pressure operated switch of the type having closed fluid chambers and a fluid pressure operated member separating the chambers, one of said chambers having a fluid connection with the closed space between the sealing members when the plunger is in its projected position, the other one of said chambers having fluid connection with one of said liquid enclosing spaces whereby said switch is operated in response to pressure differential, electrical circuitry connected to the contacts of said switch, and indicating means included in said circuitry for indicating the presence of a pressure differential greater than a predetermined amount or less than such amount.

8. In a method for detecting liquid leakage past a plunger which is adapted to be projected into and out of a cylindrical sleeve which connects spaces containing liquid under pressure, the plunger comprising cup-shaped sealing members made of resilient material and oppositely faced, the steps of moving the plunger from a retracted position in one of said spaces to a projected position within the sleeve with contraction and flexing of the rims of the sealing members as they are projected into the sleeve and with drop in pressure in the space between the sealing members to a value substantially less than the static pressure in one of said spaces, and then detecting any leakage past the sealing members by noting any drop in said pressure differential.

* * * * *